G. LANGEN.
GEARING.
APPLICATION FILED JUNE 1, 1917.

1,282,088.

Patented Oct. 22, 1918.

Witnesses.
Walter J. Jones.
Samuel S. Carr.

George Langen. Inventor.
By Robert S. Carr.
Attorney.

UNITED STATES PATENT OFFICE.

GEORGE LANGEN, OF CINCINNATI, OHIO, ASSIGNOR TO THE CINCINNATI PLANER COMPANY, OF CINCINNATI, OHIO, A CORPORATION OF OHIO.

GEARING.

1,282,088.     Specification of Letters Patent.     Patented Oct. 22, 1918.

Application filed June 1, 1917. Serial No. 172,295.

*To all whom it may concern:*

Be it known that I, GEORGE LANGEN, a citizen of the United States, residing at Cincinnati, Ohio, have invented a new and useful Improvement in Gearing, of which the following is a specification.

Figures 1, 2:
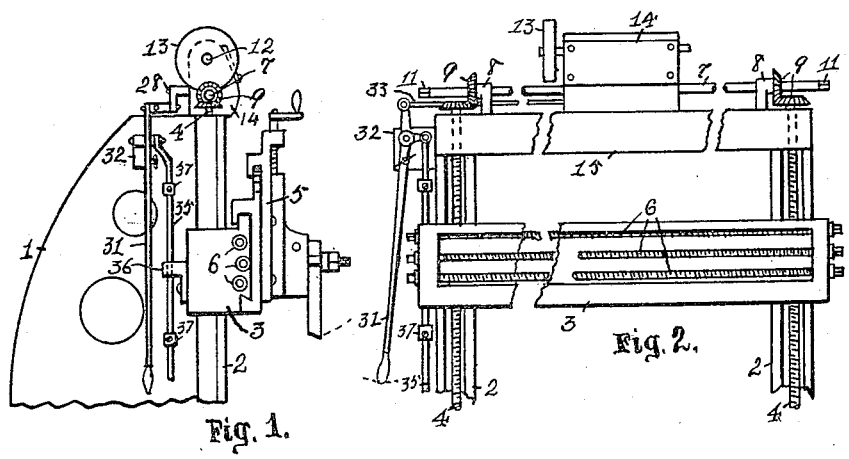
Figures 3, 4, 5:
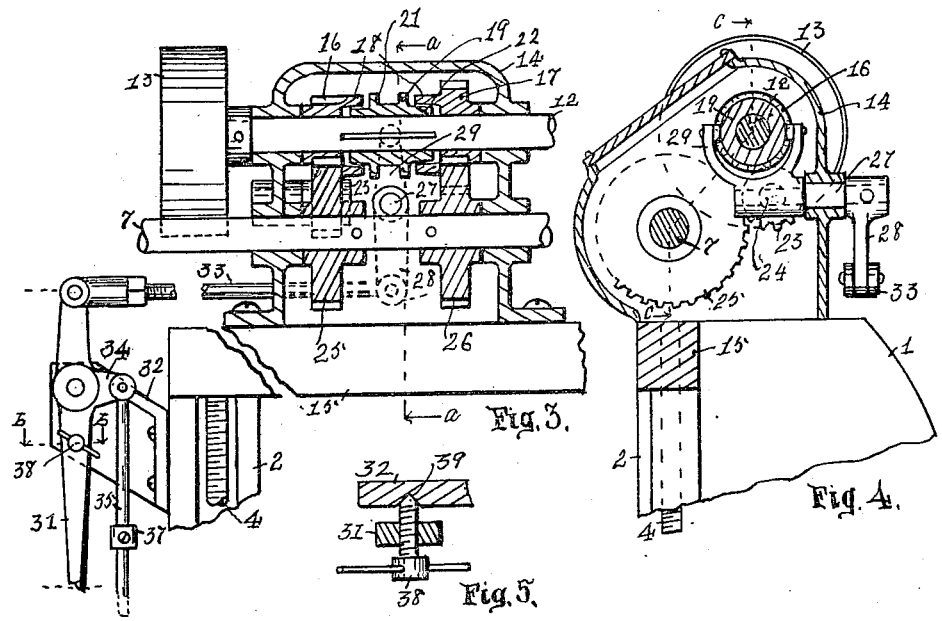

My invention relates to gearing of the class adapted to the use of machine tools or for other suitable purposes, and the objects of my improvement are to provide adjustable means for automatically throwing the gears out of action at predetermined intervals; to provide means for locking the shifting mechanism in its neutral position against accidental displacement, and to provide simple, durable and compact construction and assemblage of the various members for preventing self injury to the moving parts and for securing facility of operation and efficiency of action. These objects together with others which may be incorporated in the claims may be attained in the following described manner, as illustrated in the accompanying drawings, in which:

Figures 1 and 2 are respective side and front elevations with parts removed of a metal working planer embodying my improvement; Fig. 3 a longitudinal section on the broken line C—C of Fig. 4 of the driven gearing for raising or lowering the cross rail of the planer; Fig. 4 a transverse section on the line *a*—*a* of Fig. 3, and Fig. 5 a sectional detail on the line *b*—*b* of Fig. 3.

In the drawings 1 represents portions of the housing of a metal working planer provided with vertical front guides 2 whereon the cross rail 3 is vertically adjustable by means of the elevating screws 4, 5 one of the cross heads longitudinally adjustable on the cross rail by means of the corresponding one of the screws 6 therein, 7 an operating shaft journaled in bearings 8 on the housing and having bevel gear connections 9 with the respective elevating screws 4, said shaft being formed with its end portions 11 angular in cross section for the removable engagement therewith of an actuating crank, not shown.

A shaft 12 provided with a continuously driven pulley 13 is journaled in bearings formed in the gear box 14 which is secured on the top of the cross bar 15 of the housing. Loose gears 16 and 17 mounted on shaft 12 are each formed with a friction clutch member 18, and a spool 19 splined on said shaft is formed with the annular groove 21 and terminates at its ends in clutch members 22. The intermediate loose gear 23 mounted on a fixed stud 24 engages with the gear 16, and the gears 25 and 26 fast on the operating shaft 7 engage respectively with the intermediate gear 23 and with the loose gear 17 on shaft 12. The shaft 27 journaled in the wall of the gear box 14 is provided with the crank arm 28 and with the shifting yoke 29 which movably engages with the annular groove in the spool 19. The hand lever 31 fulcrumed on the fixed bracket 32 is connected with the crank arm 28 by means of the adjustable rod 33.

Said lever is formed with the projecting arm 34 to which the depending rod 35 is pivotally secured. Said rod is extended through an opening in the bracket 36 which is carried by the cross rail 3. Stops 37 adjustably secured on said rod are adapted to contact alternately with the said bracket in its vertical movements by means of the cross rail. The detent or clamping screw 38 threaded in the hand lever 31 may be securely engaged with the notch 39 formed in the bracket 32 as shown in Fig. 5 for locking said hand lever in the neutral position against accidental displacement.

In operation, by means of the hand lever and connecting rod the shifting yoke may be actuated to shift the spool splined on the driven shaft for alternately engaging the clutch members thereon with the clutch members on the corresponding loose gears. Gear 17 drives gear 26 with the shaft 7 in one direction and gear 16 drives the intermediate gear 23 and the gear 25 with said shaft in the opposite direction. When turned in one direction shaft 7 through its bevel gear connections serves to actuate the elevating screws to raise the cross rail on the housing and when turned in the opposite direction to lower said rail on the housing.

The cross rail may be carried by the elevating screws in this manner until the bracket thereon, by contacting with the corresponding stop on the depending rod, actuates said rod to move the hand lever and its connections to shift the spool and disengage its clutch connections with the corresponding loose gear on the driven shaft. In this manner the engagement of the bracket on the cross rail with either of the adjustable stops on the depending rod serves to actuate the hand lever and its connections with the yoke and the clutch spool into the neutral disengaged position and thereby discontinue the movement of the cross rail and prevent accidents or injury thereto.

The engagement of the hand screw in the hand lever with the notch in the adjacent bracket serves to lock said lever and its connections together with the clutch spool in the neutral disengaged position as shown in Fig. 3, and against accidental displacement which might communicate movement to the cross rail and change its vertical adjustment to the injury of the tool or the work on the table.

Having fully described my improvements, what I claim as my invention and desire to secure by Letters Patent of the United States is:

1. In a gearing construction, the combination with a cross head to be reciprocated and screws for shifting the same, of a driven shaft with intermediate gears for actuating the screws, a driving shaft with loose gears thereon and gearing connection therefor with the driven shaft, a sliding clutch feathered on said driving shaft to engage said loose gears, a hand lever with connection therefor with the sliding clutch to shift same manually, and a rod coupled to said hand lever, with adjustable stops thereon adapted to be engaged by said cross head to stop the movement of the cross head at predetermined positions.

2. In a gearing construction, the combination with a cross head to be reciprocated and screws for shifting the same, of a driven shaft with intermediate gears for actuating the screws, a driving shaft with loose gears thereon and gearing connection therefor with the driven shaft, a sliding clutch feathered on said driving shaft to engage said loose gears, a hand lever with connection therefor with the sliding clutch to shift same manually, and a rod coupled to said hand lever, with adjustable stops thereon adapted to be engaged by said cross head to stop the movement of the cross head at predetermined positions, and a clamping screw carried by said hand lever to lock same in fixed position to prevent accidental operation of the clutch mechanism.

GEORGE LANGEN.

Witnesses:
A. J. SCHNEIDER,
R. S. CARR.

Copies of this patent may be obtained for five cents each, by addressing the "Commissioner of Patents, Washington, D. C."